US012784291B2

(12) United States Patent
Humml et al.

(10) Patent No.: US 12,784,291 B2
(45) Date of Patent: Nov. 3, 2026

(54) SYSTEMS, METHODS, AND GRAPHICAL USER INTERFACES FOR AUGMENTED REALITY SENSOR GUIDANCE

(71) Applicant: CALIFORNIA INSTITUTE OF TECHNOLOGY, Pasadena, CA (US)

(72) Inventors: Julian M. Humml, Pasadena, CA (US); Morteza Gharib, Pasadena, CA (US); Thomas Roesgen, Kilchberg (CH)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 107 days.

(21) Appl. No.: 18/431,447

(22) Filed: Feb. 2, 2024

(65) Prior Publication Data

US 2024/0265585 A1 Aug. 8, 2024

Related U.S. Application Data

(60) Provisional application No. 63/442,986, filed on Feb. 2, 2023.

(51) Int. Cl.

*G09G 3/20* (2006.01)
*G01P 1/07* (2006.01)
*G01P 5/00* (2006.01)
*G06T 7/70* (2017.01)
*G06T 11/00* (2006.01)

(52) U.S. Cl.

CPC ................ *G06T 11/00* (2013.01); *G01P 1/07* (2013.01); *G01P 5/001* (2013.01); *G06T 7/70* (2017.01); *G06T 2207/20081* (2013.01)

(58) Field of Classification Search

CPC ........................ G06T 7/70; G06T 2207/20081

USPC .......................................................... 345/633

See application file for complete search history.

(56) References Cited

U.S. PATENT DOCUMENTS

| | | | |
|---|---|---|---|
| 9,292,951 | B2 | 3/2016 | Muléet al. |
| 10,699,165 | B2 | 6/2020 | Shreve et al. |
| 10,818,199 | B2 | 10/2020 | Buras et al. |
| 10,827,322 | B1 | 11/2020 | Lal et al. |
| 10,878,633 | B2 | 12/2020 | Steiner et al. |
| 10,984,242 | B1 | 4/2021 | Atlas et al. |

(Continued)

FOREIGN PATENT DOCUMENTS

| | | | |
|---|---|---|---|
| AU | 2022203420 | A1 | 6/2022 |
| EP | 3634029 | B1 | 12/2020 |

(Continued)

OTHER PUBLICATIONS

Aldas N. D. T. et al., "AIGuide: An Augmented Reality Hand Guidance Application for People with Visual Impairments," *ASSETS '20: Proceedings of the 22nd International ACM SIGACCESS Conference on Computers and Accessibility*, 2020.

(Continued)

*Primary Examiner* — Samantha (Yuehan) Wang

(74) *Attorney, Agent, or Firm* — Steinfl + Bruno LLP

(57) ABSTRACT

Systems and methods for real-time environmental sensor data gathering is enhanced using augmented reality, with a virtual target object being presented to the user of the sensor device that guides the user where to move the sensor device next. A combination of pose data for the sensor and data modeling of the sensor data allows for users with minimal training to make optimized environmental readings.

17 Claims, 17 Drawing Sheets

(56) References Cited

U.S. PATENT DOCUMENTS

| | | | |
|---|---|---|---|
| 11,500,053 B2 | 11/2022 | Sinclair et al. | |
| 2013/0237811 A1 | 9/2013 | Mihailescu et al. | |
| 2014/0327792 A1 | 11/2014 | Mulloni et al. | |
| 2015/0062120 A1 | 3/2015 | Reisner-Kollmann et al. | |
| 2016/0019212 A1* | 1/2016 | Soldani | G06T 15/005 345/633 |
| 2018/0108179 A1* | 4/2018 | Tomlin | G06F 3/0346 |
| 2018/0204380 A1* | 7/2018 | Kumar | G06F 3/0346 |
| 2019/0005397 A1* | 1/2019 | Coleman | G06F 17/18 |
| 2019/0254842 A1 | 8/2019 | Lunau et al. | |
| 2021/0311205 A1* | 10/2021 | Davidson | G01S 19/421 |
| 2022/0270230 A1* | 8/2022 | Zahid | G06T 7/001 |
| 2023/0234233 A1* | 7/2023 | Goyal | G06T 7/269 |

FOREIGN PATENT DOCUMENTS

| | | |
|---|---|---|
| JP | 6423435 B2 | 11/2018 |
| KR | 101745506 B1 | 6/2017 |
| WO | 2016/078919 A1 | 5/2016 |
| WO | 2022/006586 A1 | 1/2022 |
| WO | 2022/020344 A1 | 1/2022 |

OTHER PUBLICATIONS

Aldunate R. G. et al.,, "Enabling Communication in Emergency Response Environments," *Sensors*, 2012.
Bardosi Z. et al., "CIGuide: in situ augmented reality laser guidance," *International journal of computer assisted radiology and surgery*, 2020.
Bermúdez G. S. C. et al., "Magnetosensitive e-skins with directional perception for augmented reality," *Science Advances*, 2018.
Cao J. et al., "Mobile Augmented Reality: User Interfaces, Frameworks, and Intelligence," *ACM Computer Surveys*, 2023.
Cardenas-Robledo L. A. et al., "Extended reality applications in industry 4.0.—A systematic literature review," *Telematics and Informatics*, 2022.
Chen W. et al., "Decision support system for urban major hazard installations management based on 3DGIS," *Physics and Chemistry of the Earth, Parts A/B/C*, 2019.
Condino S. et al., "Wearable Augmented Reality Platform for Aiding Complex 3D Trajectory Tracing," *Sensors*, 2020.
Eom S. et al., "NeuroLens: Augmented Reality-based Contextual Guidance through Surgical Tool Tracking in Neurosurgery," *2022 IEEE International Symposium on Mixed and Augmented Reality*, 2022.
Franceschini F. et al., "Towards the use of augmented reality techniques for assisted acceptance sampling," *Proceedings of the Institution of Mechanical Engineers, Part B: Journal of Engineering Manufacture*, 2016.
Huuskonen J. et al., "Soil sampling with drones and augmented reality in precision agriculture," *Computers and Electronics in Agriculture*, 2018.
International Search Report and Written Opinion for International Application No. PCT/US2024/014222 filed on Feb. 2, 2024 on behalf of California Institute of Technology Mail Date: Jun. 3, 2024 10 pages.
Jin Y-H. et al., "A mobile augmented reality system for the real-time visualization of pipes in point cloud data with a depth sensor," *Electronics*, 2020.
Lin M. A. et al., "HoloNeedle: Augmented-reality Guidance System for Needle Placement Investigating the Advantages of 3D Needle Shape Reconstruction," 2018.
Loffler C. et al., "A Sense of Quality for Augmented Reality Assisted Process Guidance," *2020 IEEE International Symposium on Mixed and Augmented Reality Adjunct*, 2020.
Magdy R. et al., "Deep Reinforcement Learning Approach for Augmented Reality Games," *International Mobile, Intelligent, and Ubiquitous Computing Conference*, 2021.
Medhurst E. et al., "Radiation Detection, Measurement, and Visualization Assisted by Virtual and Augmented Reality," 2019.
Mengya Z. et al., "STARE: Augmented Reality Data Visualization for Explainable Decision Support in Smart Environments," *IEEE Access*, 2022.
Müller A., "Real-Time 3D Flow Visualization Technique with Large Scale Capability," *ETH Zurich*, Zurich, 2016.
Park B. J. et al., "Augmented and mixed reality: technologies for enhancing the future of IR," *Journal of Vascular and Interventional Radiology*, 2020.
Park S. et al., "Design and Implementation of a Smart IoT Based Building and Town Disaster Management System in Smart City Infrastructure," *Applied Sciences*, 2018.
Polap D. et al., "Obstacle detection as a safety alert in augmented reality models by the use of deep learning techniques.," *Sensors*, 2017.
Rahman A. et al., "An integrated framework of sensing, machine learning, and augmented reality for aquaculture prawn farm management," *Aquacultural Engineering*, 2021.
Rao J. et al., "A Mobile Outdoor Augmented Reality Method Combining Deep Learning Object Detection and Spatial Relationships for Geovisualization," *Sensors*, 2017.
Ren P. et al., "Edge-assisted distributed DNN collaborative computing approach for mobile web augmented reality in 5G networks.," *IEEE Networks*, 2020.
Shamir R. et al., "An augmented reality guidance probe and method for image-guided surgical navigation.," *5th International Symposium on Robotics and Automation.*, 2006.
Soulier K. E. et al., "Estimating Illumination Direction for Augmented Reality in Real-Time by using Low-Cost Sensors," *Journal of Computer Science & Technology*, 2017.
Stark E. et al., "Using Augmented Reality and Internet of Things for Control and Monitoring of Mechatronic Devices," *Electronics*, MDPI, 2020.
Subakti H. et al., "Indoor Augmented Reality Using Deep Learning for Industry 4.0 Smart Factories," *IEEE 42 Annual Computer Software and Applications Conference*, 2018.
Teatini A. et al., "Influence of sampling accuracy on augmented reality for laparoscopic image-guided surgery," *Minimally Invasive Therapy & Allied Technologies*, 2019.
Von-Atzigen M. et al., "HoloYolo: A proof-of-concept study for marker-less surgical navigation of spinal rod implants with augmented reality and on-device machine learning.," *The International Journal of Medical Robotics and Computer Assisted Surgery*, 2021.
Wang L. et al., "An Augmented Reality-Assisted Prognostics and Health Management System Based on Deep Learning for IoT-Enabled Manufacturing," *Sensors*, 2021.
Wen R. et al., "Augmented reality guidance with multimodality imaging data and depth-perceived interaction for robot-assisted surgery," *Robotics*, 2017.
Woolman M. et al., "In situ tissue pathology from spatially encoded mass spectrometry classifiers visualized in real time through augmented reality," *Chemical science*, 2020.
Zhang G. et al., "Development and feasibility evaluation of an AR-assisted radiotherapy positioning system," *Personalized Radiation Therapy: Guided with Imaging Technologies*, 2023.
Zhang Z. et al., "An Augmented Reality Platform for Introducing Reinforcement Learning to K-12 Students with Robots," 2021.
Zheng M. et al., "Location-based Augmented Reality In-situ Visualization Applied for Agricultural Fieldwork Navigation," *2019 IEEE International Symposium on Mixed and Augmented Reality Adjunct*, 2019.
Zhu Y. et al., "Virtual and augmented reality technologies for emergency management in the built environments: A state-of-the-art review," *Journal of Safety Science and Resilience*, 2021.

* cited by examiner

SYSTEMS, METHODS, AND GRAPHICAL USER INTERFACES FOR AUGMENTED REALITY SENSOR GUIDANCE

CROSS-REFERENCE TO RELATED APPLICATIONS

The present application is related to U.S. Provisional Patent Application No. 63/442,986 filed on Feb. 2, 2023, the disclosure of which is incorporated herein by reference in its entirety.

BACKGROUND

Handheld sensors, such as flow field measurement devices, allow for determining sensor values in an area of interest. As data is gathered, the sensor can be moved to different locations within the area to get more data about the entire field.

In engineering applications, measuring three-dimensional fields is an essential part of the development process. New designs are discovered by adapting an experiment's parameters and iteratively optimizing the outcome, examined by measurements, to meet the desired specifications. Predictions of previously run physics simulations are often measured and validated in real-life experiments at later stages of a development cycle. Especially in the field of aerodynamics, to this date, it is challenging to forecast the complex state of flow fields. In environments where substantial uncertainties about the boundary conditions of the governing equations exist, the results of physics simulations are also subject to considerable uncertainty.

Augmented Reality (AR) allows for the overlay of virtual symbols and images over a view of a real-world region.

SUMMARY

The system presented herein provides for an improved manner to gather data using handheld sensors by combining a pose determination of the sensor with augmented reality and sensor location optimization software. By determining the current location of the sensor and the optimal location to move the sensor to, an augmented reality system can provide visualization to allow the sensor holder to know where to move the sensor to optimize data gathering, without any special skill or knowledge from the user.

Novel measurement systems and techniques for quantifying environmental fields based on an Augmented Reality (AR) system and Active Learning algorithms are presented herein. Environmental sampling is an essential tool across various fields in engineering applications, such as site monitoring, environmental protection initiatives, scientific research, engineering, and agriculture. Environmental sampling refers to different methods in different fields but may be summarized as moving sensors at various locations in space and sequentially collecting data points. The task of the sampling system is to deliver the best possible measurement results, reconstruct an optimal prediction of the sampled quantity with respect to its surroundings, and provide the basis for understanding the physical effects or documenting the present conditions. Sampling many different quantities is possible, but they can be formalized in either a scalar or a vector field, depending on the physical effect and the sensor or measurement technique used.

According to a first aspect, a system for taking sensor readings of a region is disclosed, the system comprising: a sensor device configured to take the sensor readings and to provide pose information of the sensor device; computer software on a non-transient medium configured to, when run on a computer, determine a location to take a next sensor reading based on previous sensor readings and the pose information; and a display device configured to display a virtual object at the location overlayed on a view of the region.

According to a second aspect, a method for taking sensor readings of a region is disclosed, the method comprising: taking readings from the region using a sensor device; computing pose information of the sensor device producing pose data; computing a location in the region for a next sensor reading based on previous sensor readings and the pose data; and displaying on a display device a virtual indicator overlaid on a view of the region, such that the virtual indicator is at the location.

Further aspects are disclosed in the descriptions and drawings herein, as understood by one skilled in the art.

BRIEF DESCRIPTION OF DRAWINGS

FIG. 1A shows an example of goggle-based AR and FIG. 1B shows an example of mobile device-based AR.

FIG. 3A shows an example of a goggle-based AR with a hand-held sensor. FIG. 3B shows an example of the system but with a mobile device-based AR. FIG. 3C shows an example of the system but with a wearable sensor. FIG. 3D shows an example of the system but with tracking markers on the goggles for pose estimation.

FIG. 6A shows an example wearable sensor and FIG. 6B shows an example hand-held sensor.

DETAILED DESCRIPTION

In embodiments herein, a sensor operator's Augmented Reality device provides a virtual spatial reference indicator to a computer-determined measuring point and offers novel intuitive interaction techniques for sampling environmental fields in real time that is herein referred to as Spatial Sensing. Integrating the operator into a closed-loop Active Learning framework during the measurement shifts the expertise about the measurement process to the expert algorithm (ML/AI). It allows many operators or frontline workers to use the proposed method to make decisions informed by real-time quantitative feedback.

As used herein, "augmented reality" refers to the combination of real-world views/video with virtual objects/icons/text (computer generated) viewed together. In some embodiments, the real-world is viewed through a camera or array of cameras and the virtual objects are added into the video. In some embodiments, the real-world is viewed directly through a transparent screen and the virtual objects are projected or otherwise displayed on the screen.

As used herein, a "display device" or "display generating device" is any device capable of viewing an augmented reality.

As used herein, a "head mounted display" is a display device that the viewer wears on their head.

As used herein, a "sensor device" is a device that is either hand-held, user guided, or wearable that is capable of sampling some environmental factor and converting it to data. Examples of types of environmental factors are described herein.

In an example, an operator with a head-mounted display (HMD) holds a sensor system in her hand. The sensor system has inside-out tracking capability. A pattern of infrared LEDs mounted on the HMD is referenced by the sensor system's cameras, allowing it to calculate a relative pose between the sensor and the operator's head and, combined with the global pose of the HMD, derive a global position and orientation of the environmental sensor. As the computing capabilities of the current HMD devices are limited, a server is connected wirelessly, hosting the data model and analyzing the stream of measured data in real time. If the HMD hardware allows, the data model can also run on the device itself. The task is to sample an environmental field (e.g., a flow field, gas concentration, etc.) by moving the sensor through the field. Holographic overlays indicate to the operator the current measurement state of the sensor, the domain under investigation, and the optimal next sampling location calculated by the data model. A virtual object (target) is presented in the AR overlay to let the operator know where to move the sensor for optimal measurements, as determined by a computer algorithm.

Figure 1A:
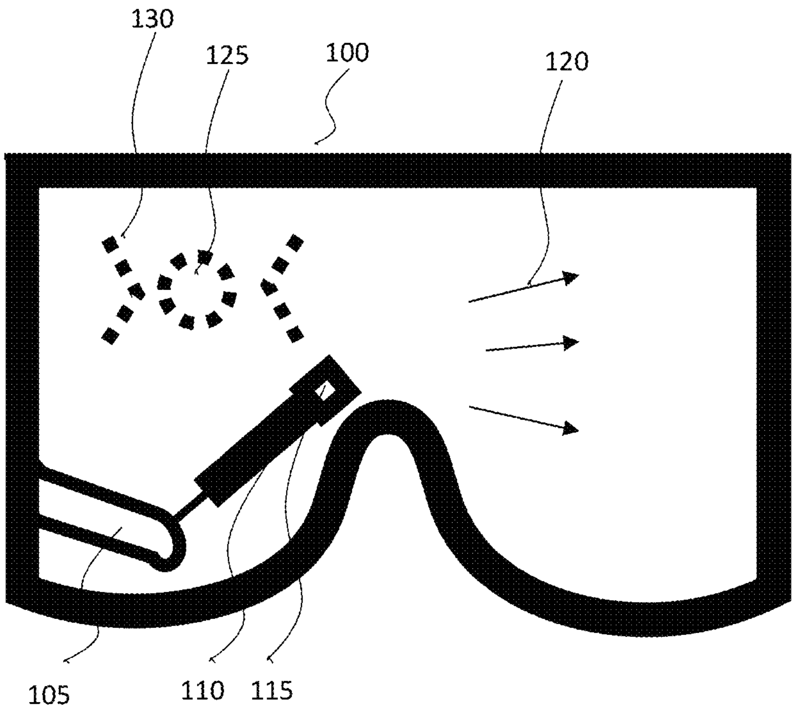
FIGS. 1A and 1B show examples of user interfaces for augmented reality (AR) for systems and methods described herein.

FIG. 1A illustrates an example user interface on a head-mounted device with a display generation component 100 (e.g., head-mounted display) worn by the human operator 105, blending the view of the physical world with the sensor-system 110 and a virtual indicator 125 visualizing the current suggested location for the user 105 to move the sensor head 115 to. The system can also include virtual indications of the senor readings 120, such as arrows showing flow direction and strength. The virtual indicator 125 can be any shape, such as a circle (shown), square, cross-hairs, point, diamond, etc. and can optionally include side indicators 130 such as chevrons that can indicate distance from the user by changing size or distance from the central indicator (e.g. close to the central indicator means close to the user, far from the central indicator means further from the user). The AR display can also show other information, such as text or icons displaying device battery life, current field strength at the sensor device, time, warnings, etc. A visual indication (e.g., a progress bar) can be included that displays the measurement's current progress and stage (e.g., exploration or exploitation).

For the determination of the proposed measurement location 125, the algorithms from the families of Uncertainty Quantification and/or Data Assimilation are intended (Gaussian Process Regression, Statistical Methods, Kalman Filtering, etc.). This algorithm can be composed of layers of functions and methods, including traveling salesman-like minimization problems for determining the order of sampling of the proposed locations. The results of this algorithm are dynamically updated as the measurement progresses, and additional data is available.

Figure 1B:
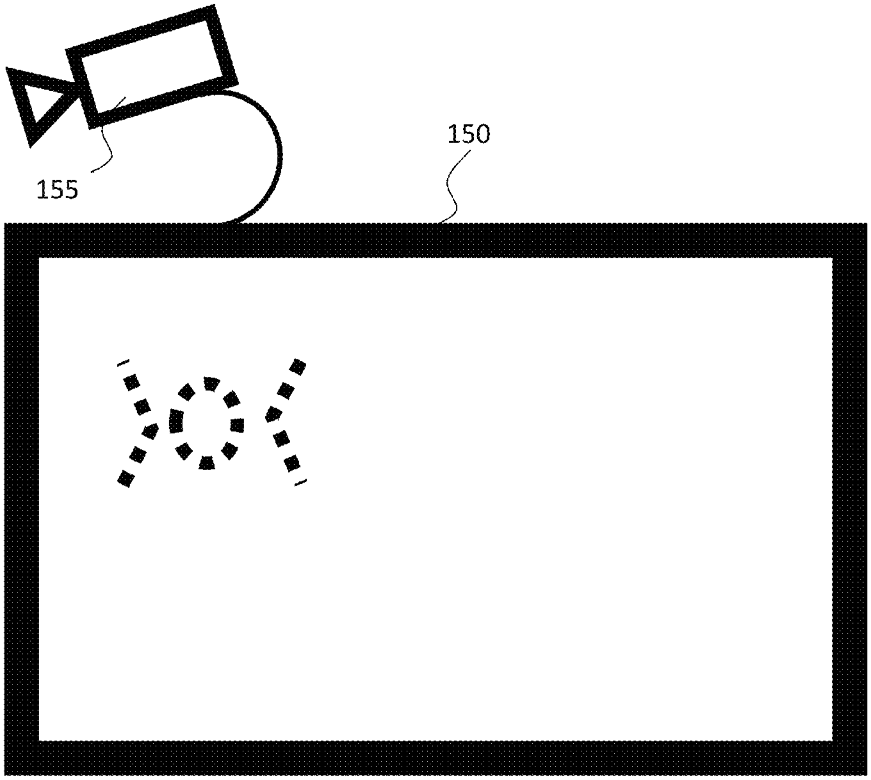

FIG. 1B shows a system similar to FIG. 1A, except that the display generation component is a mobile device 150 with a camera 155 either built-in or attached to the device (note that the head-mounted display could also use either a built-in camera or external camera).

Figure 2:
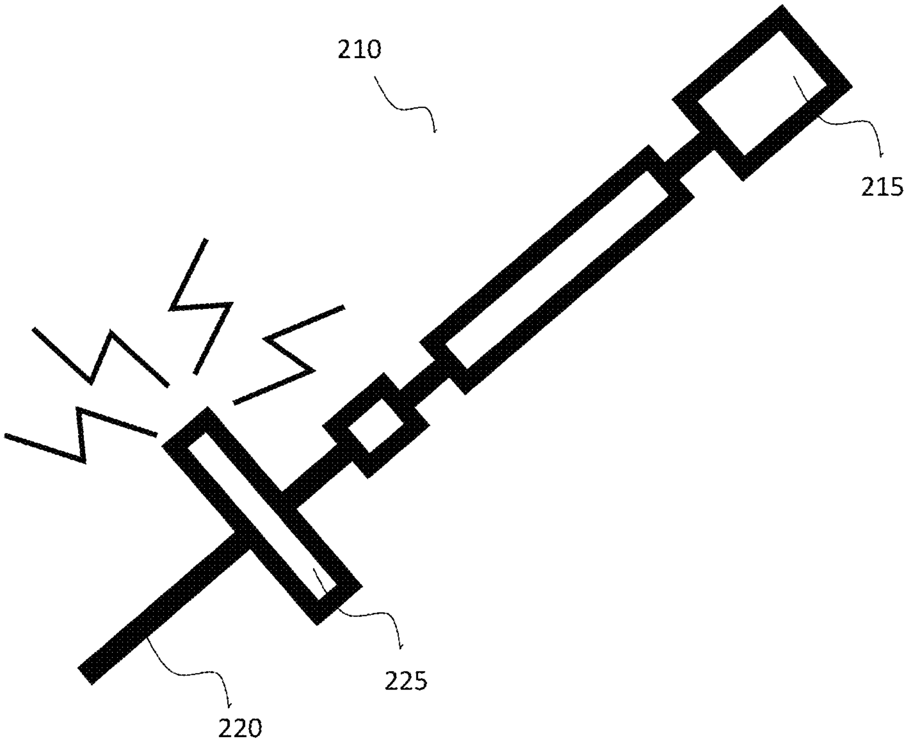
FIG. 2 shows an example of a sensor device including haptic feedback.

FIG. 2 shows an example sensor device for some embodiments. The hand-held sensor device 210 includes a sensor head 215 that takes the sensor readings and a handle 220 to be held by the user. The sensor can include a haptic feedback module 225 that can, through vibrations, indicate and signal sensor alignment, measurement progress or other information on the system state to the user, thereby augmenting the AR experience.

Figure 3A:
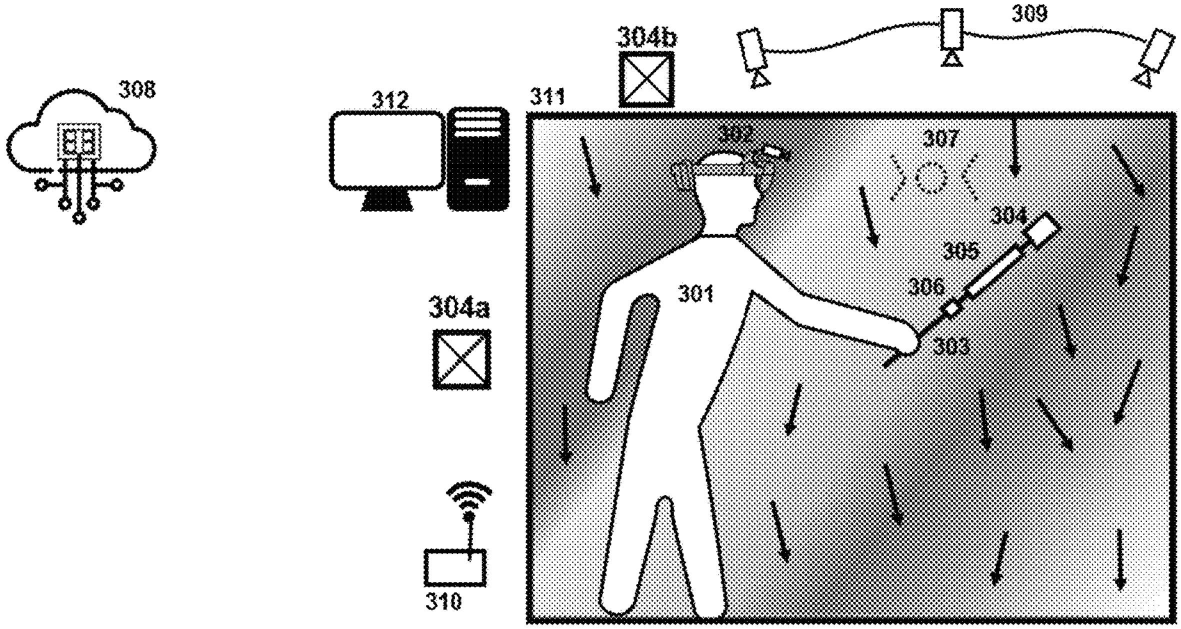
FIGS. 3A-3D show example configurations of an AR system for systems and methods described herein.

FIG. 3A shows the system includes a user 301, a head-mounted device with a display generation component 302 (e.g., a head-mounted device (HMD), a display, a projector, a touchscreen, etc.), a user-guided sensor-system 303, which includes but is not limited to, an environmental sensor or a subsystem of an environmental measurement system 304, a passive component for spatial referencing (e.g., optical motion capture system, magnetic motion capture system, ultrasonic motion capture system, camera inside-out or outside-in tracking, object pose or hand pose detection) 305 and a communication module (e.g., Universal Serial Bus, Ethernet, Wi-Fi, Bluetooth, etc.) 306. In this example, an active component of the spatial referencing system 309 tracks the location of the passive component 305. An onsite computer unit (e.g., personal computer, workstation, etc.) 312 combines the measurement of the environmental sensor with the location of the sensor-system. The data can then be fed forward to another computer unit or server 308, which might or might not be located onsite. A data model executed on one of the computers 308 or 312 processing the sensor stream provides a suggested location and orientation of the sensor device 303. Therefore, a virtual indicator object 307 is displayed in the field of view of the user indicating the current optimal location and orientation of the sensor 304. This provides an optimized method to sample a scalar or vector field 311 (e.g., pressure, temperature, fluid velocity, magnetic field, light intensity, gas concentration, radiation, etc.). The communication between 303, 302, 312, 309, and 308 can be through an external wireless network (e.g., 5G, Wi-Fi, Bluetooth), or wired, or a combination thereof. Additional (one or more) external fixed sensors 304*a* and 304*b* can be used to provide further environmental sensor data for the system.

Figure 3B:
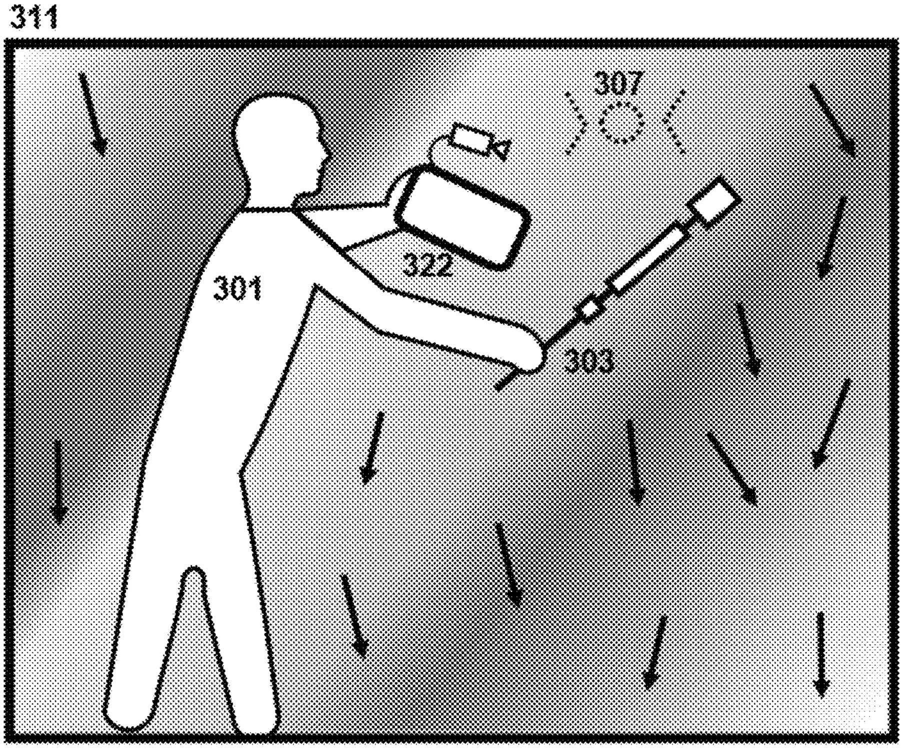

FIG. 3B shows a system similar to that of FIG. 3A, except in this embodiment the user 301 uses a mobile device 322, such as a computer tablet or smartphone, to view the field 311, sensor device 303, and the virtual indicator object 307, as well as other data/images used in the AR experience.

Figure 3C:
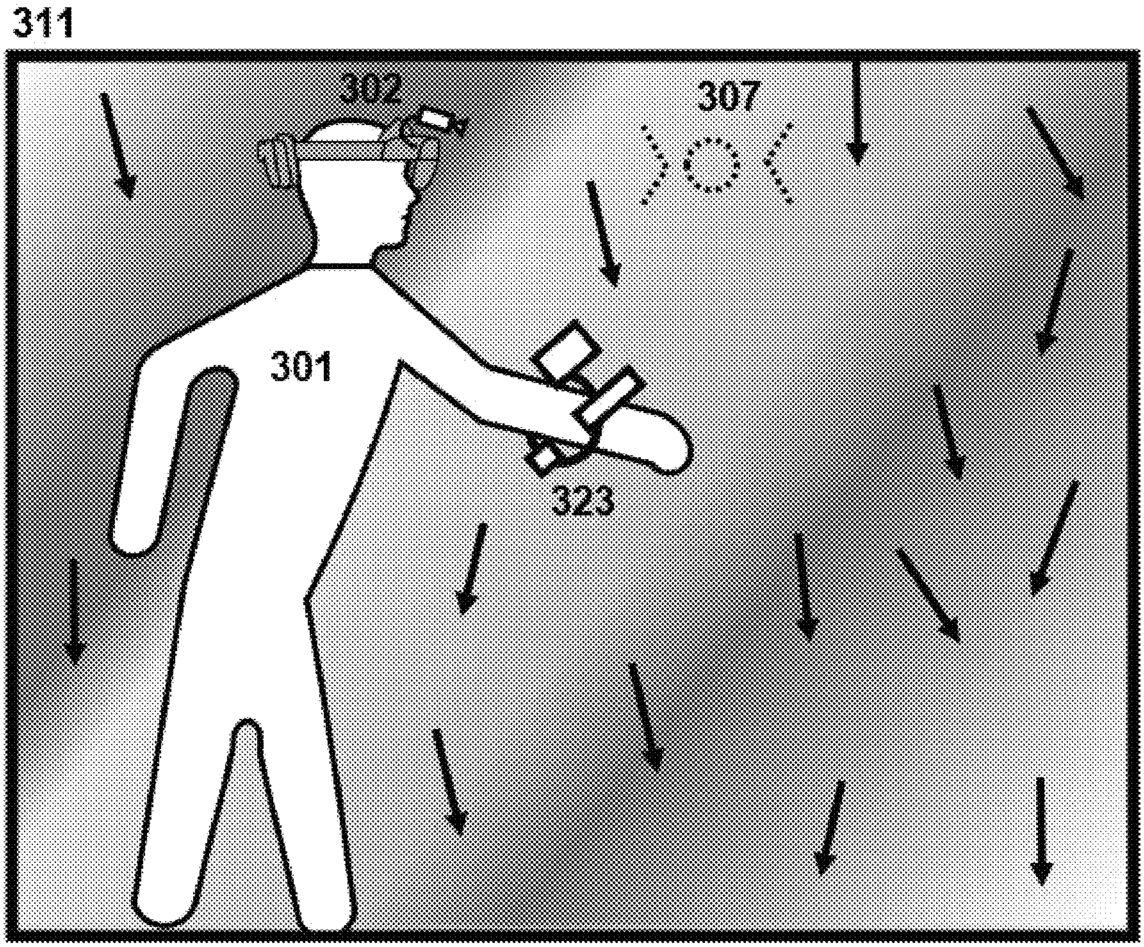

FIG. 3C shows a system similar to that of FIG. 3A, except in this embodiment the user 301 uses a wearable sensor device 323 that is to be moved to the indicator object 307 displayed on the display component 302 for the field 311. In some embodiments, the wearable sensor (e.g., as depicted in FIG. 3C) is used with a mobile device (e.g., as depicted in FIG. 3B).

Figure 3D:
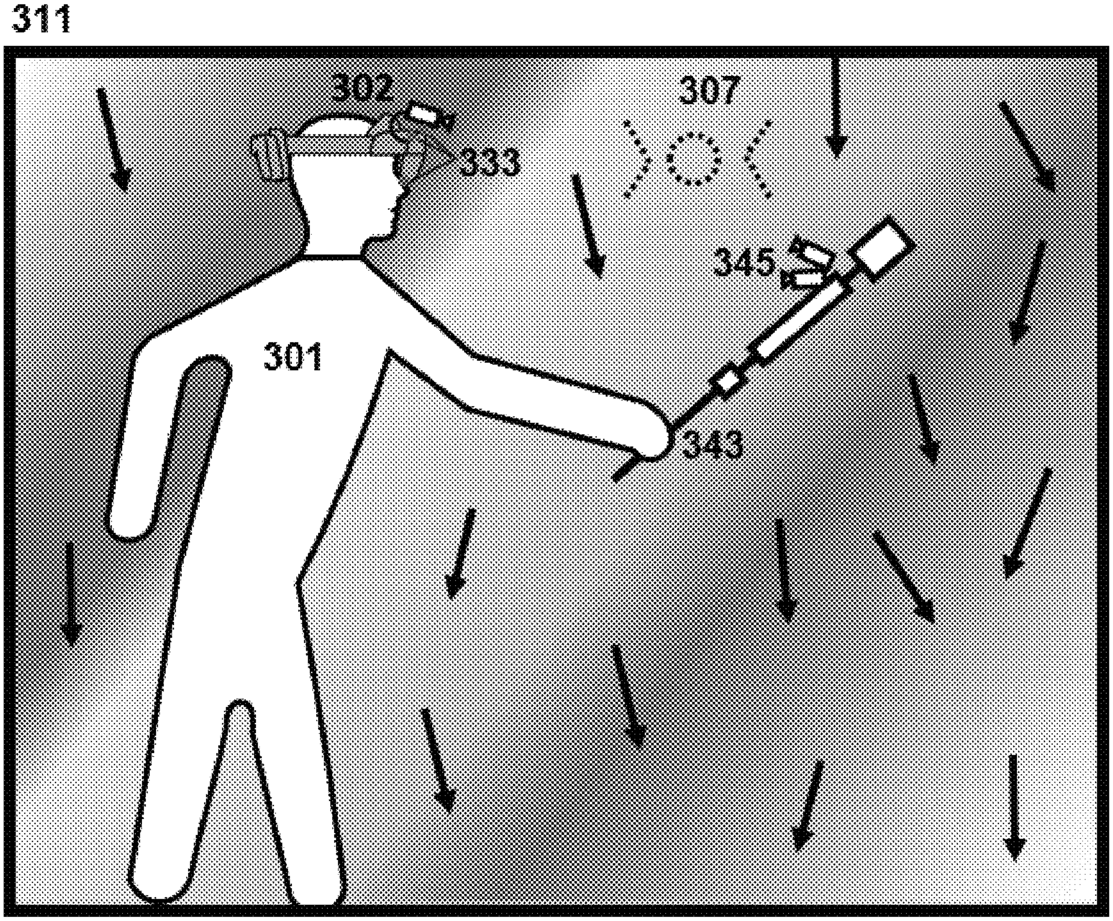

FIG. 3D shows a system similar to that of FIG. 3A, except in this embodiment the user 301 uses a sensor device 343 that is to be moved to the indicator object 307 displayed on the display component 302 for the field 311, and the display component 302 includes markers 333 that can be used by cameras 345 on the sensor device 343 to help the system determine pose information of the sensor device 343. In some embodiments, markers can be light emitting diodes (LEDs), such as infrared LEDs, or specifically colored dots/balls, or retroreflective elements.

Some embodiments include, as the display device, a head mounted display (HMD) capable of its own visual-inertial-odometry/simultaneous localization and mapping algorithm, providing a coordinate system within the user movement. Also, markers 333 visible to the sensing system 345 are rigidly attached to the HMD. The markers might be LEDs (visible or invisible spectrum, i.e., infrared), fiducial markers or recognizable shapes or distinct locations. These markers are tracked by the system of 343, establishing a reference between the sensor location and the HMD. As the HMD tracks itself, a global location of the marker can be calculated. Further, the system 343 includes a communication module (e.g., Universal Serial Bus, Ethernet, Wi-Fi, Bluetooth, etc.). One or more processors of the device 302 or subcomponents of it combine the current measurement of the environmental system with the current location of the sensor-system. The data is then fed forward to a computer unit or server (see 308 of FIG. 3A), which might or might not be located onsite (e.g., on a cloud server). A data model executed on the computer processing the sensor stream provides a suggested sampling location and orientation of the sensor-system 343. Therefore, a virtual object 307 is displayed in the field of view of the user indicating the current optimal sampling location and orientation. The goal of the method is to sample the scalar or vector field 311 (e.g., pressure, temperature, fluid velocity, magnetic field, light intensity, gas concentration, radiation, etc.).

Figure 4A:
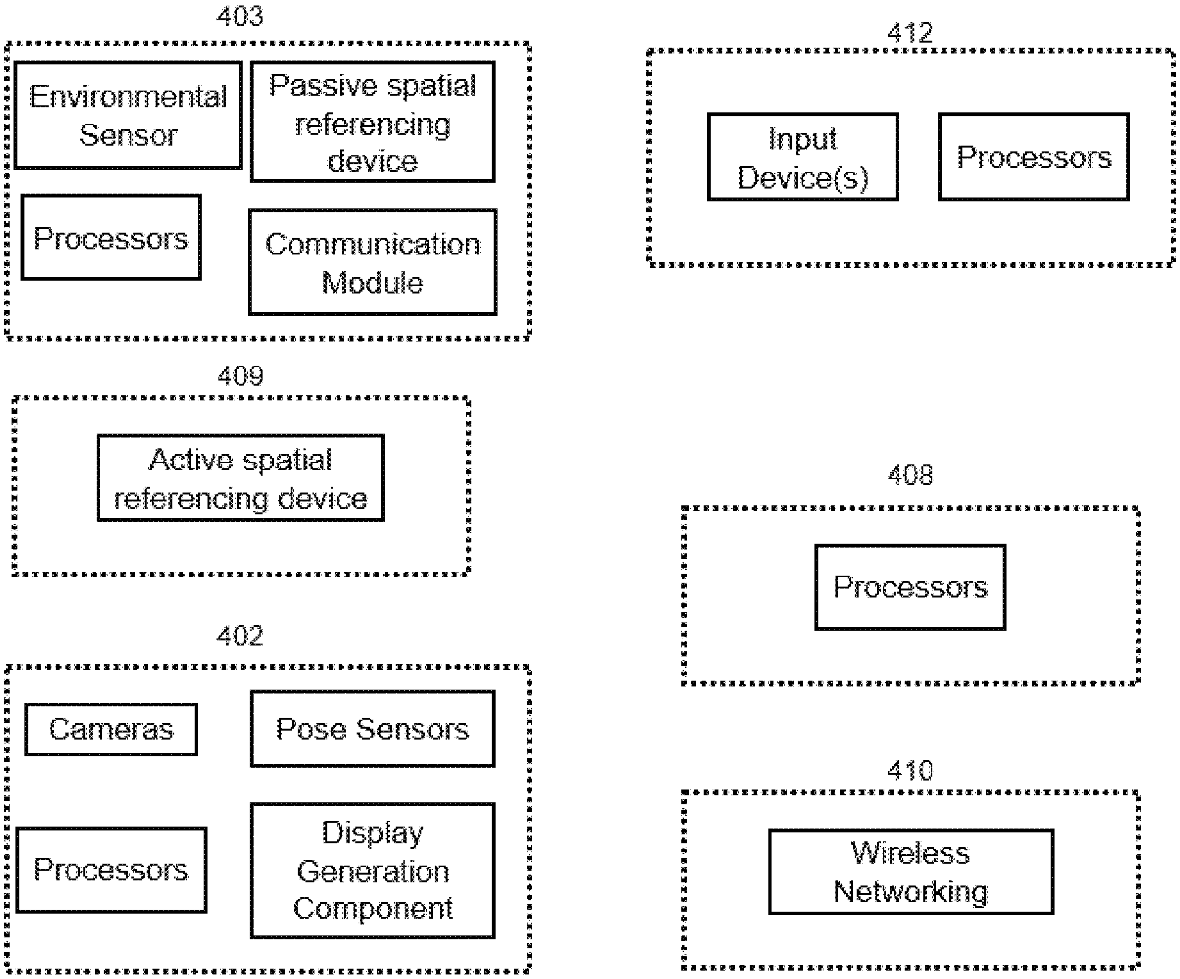
FIGS. 4A-4F shows example simplified systems with their modules.

FIG. 4A shows an example simplified system according to some embodiments. The sensor device 403 can include an environmental sensor, processors, communication module, and passive spatial referencing device (e.g., optical motion capture system, magnetic motion capture system, ultrasonic motion capture system, camera inside-out or outside-in tracking). The spatial referencing system 409 tracks the passive spatial referencing device through its own active spatial referencing device (e.g., cameras/magnetic sensors/acoustic sensors/etc.). The display generation system 402 can include cameras (to view the surrounding area for AR), pose sensors (to determine the pose of the display), processors, and a display generation component (e.g., screen). The system can also include an external processing device 412, a server 408, and/or a wireless networking system 410 to enable communication between the systems.

Figure 4B:
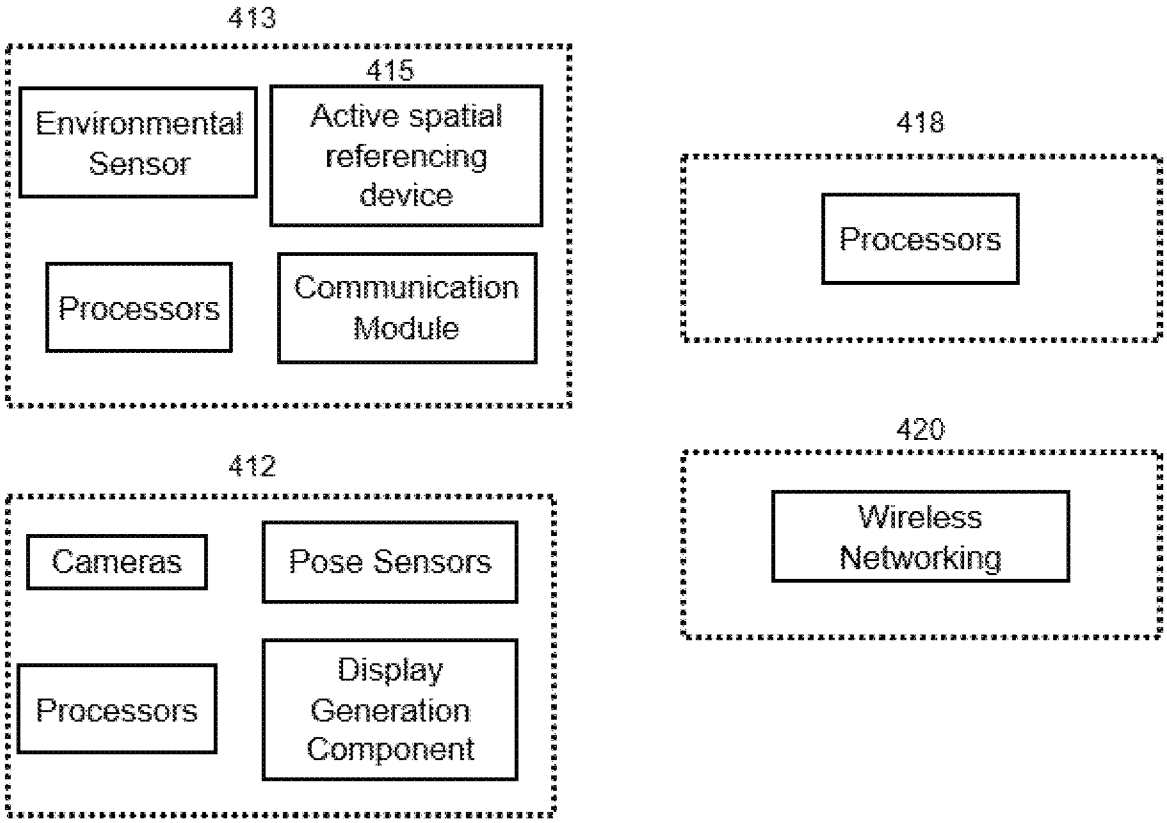

FIG. 4B shows an example simplified system according to some embodiments. The sensor device 413 can include an environmental sensor, processors, communication module, and an active spatial referencing device 415 (e.g., cameras). The display generation system 412 can include cameras (to view the surrounding area for AR), pose sensors (to determine the pose of the display), processors, and a display generation component (e.g., screen). The system can also include an external server 418 and a wireless networking system 420.

Figure 4C:
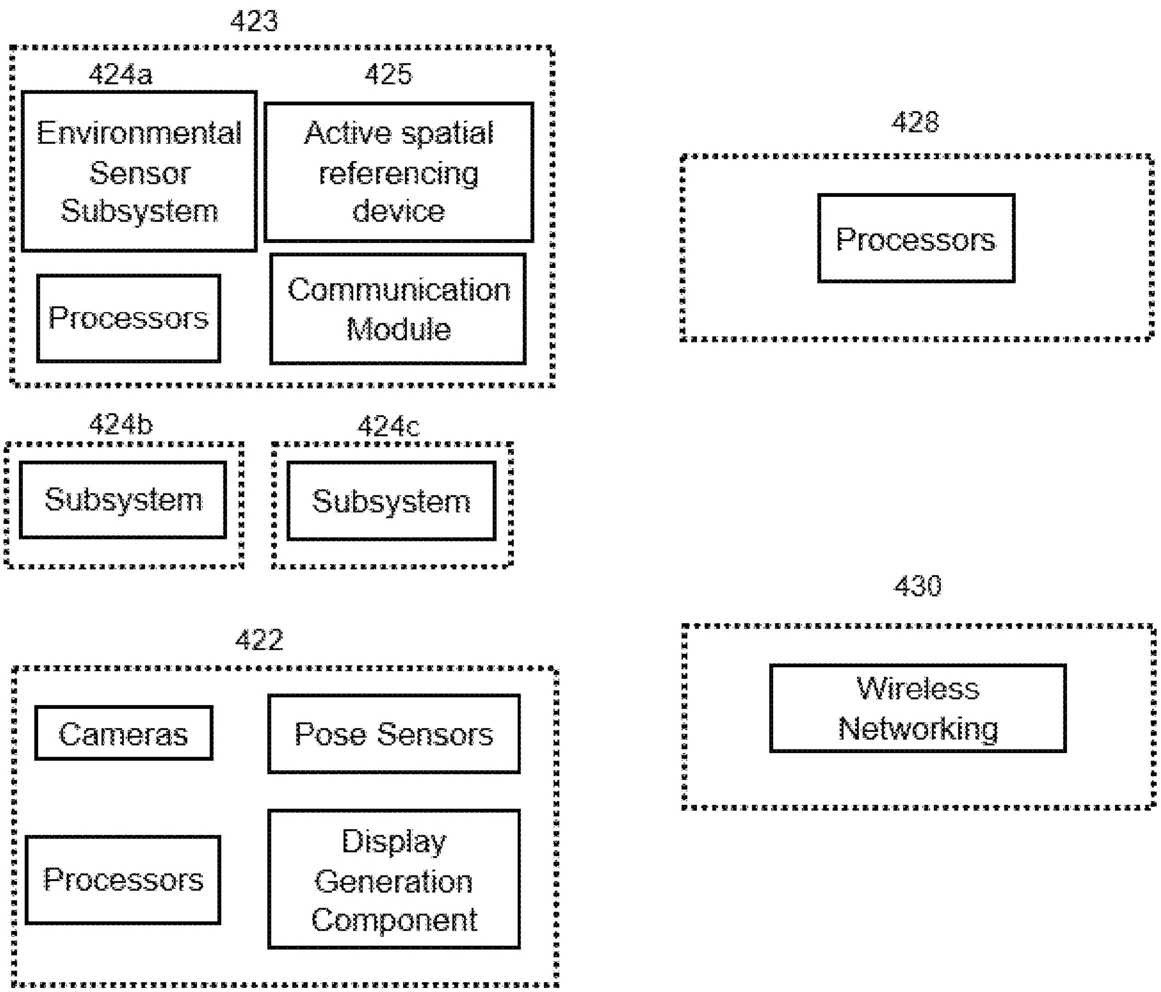

FIG. 4C shows an example simplified system according to some embodiments. The sensor device 423 can include an environmental sensor 424*a*, processors, communication module, and an active spatial referencing device 415 (e.g., cameras). The display generation system 422 can include cameras (to view the surrounding area for AR), pose sensors (to determine the pose of the display), processors, and a display generation component (e.g., screen). The system can also include an external server 428 and a wireless networking system 430. The system can also include one or more external environmental sensor systems 424*b* and 424*c*.

Figure 4D:
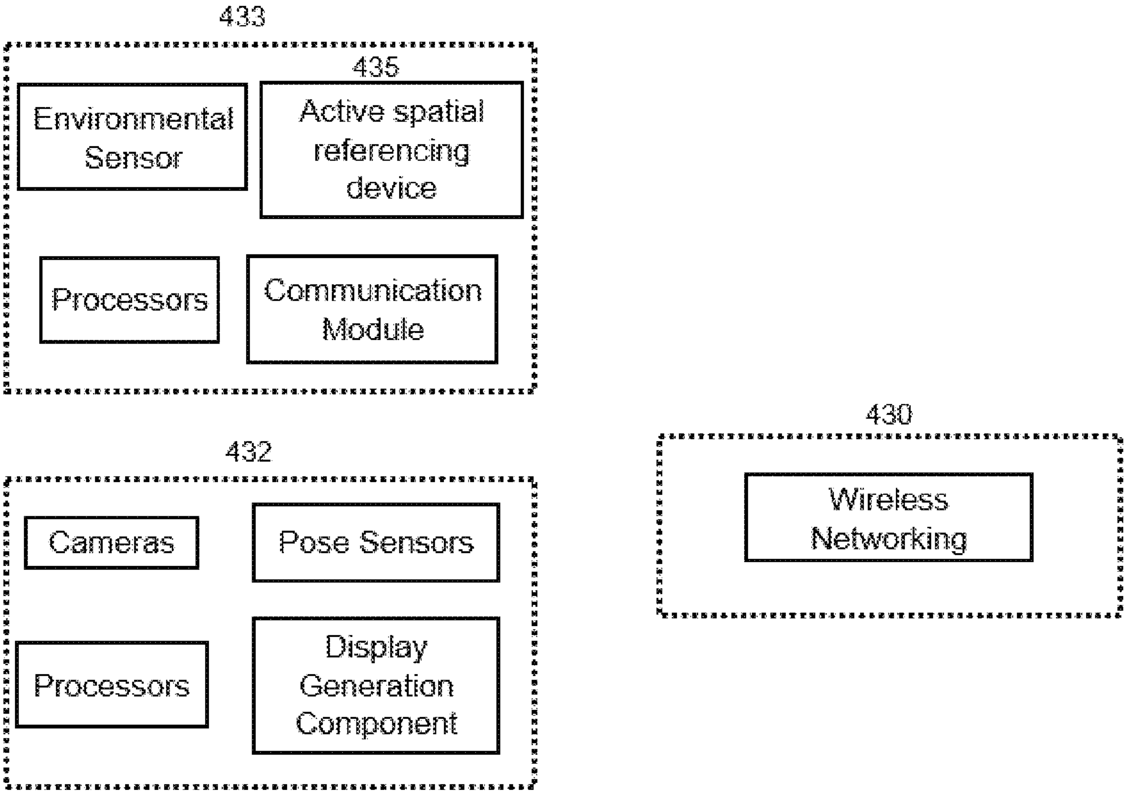

FIG. 4D shows an example simplified system according to some embodiments. The sensor device 433 can include an environmental sensor, processors, communication module, and an active spatial referencing device 435 (e.g., cameras). The display generation system 432 can include cameras (to view the surrounding area for AR), pose sensors (to determine the pose of the display), processors, and a display generation component (e.g., screen). The system can also include a wireless networking system 420.

Figure 4E:
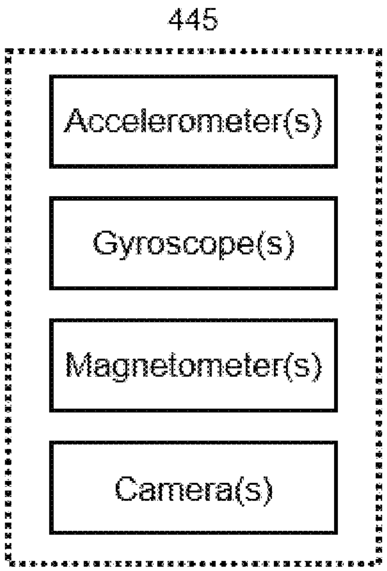

FIG. 4E shows an example of a pose sensor system 445, which can include one or more of accelerometers, gyroscopes, magnetometers, and cameras.

Figure 4F:
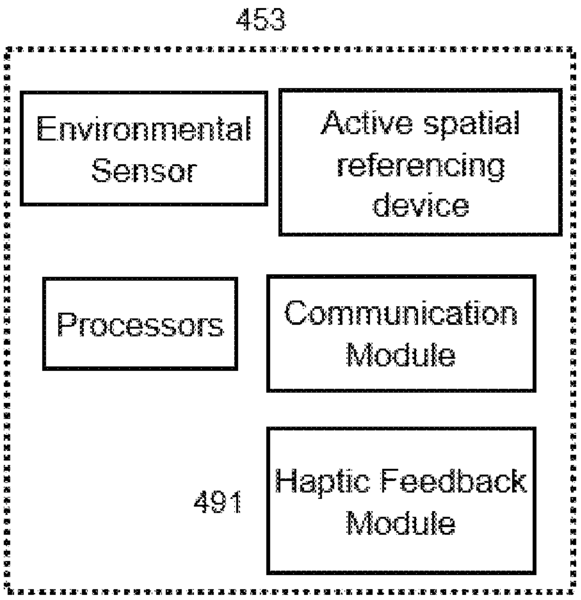

FIG. 4F shows and example of a sensor device 453 that includes a haptic feedback module 491, in addition to the other components. In some embodiments, the sensor device can also include a microphone or an array of microphone for audio data. Examples of environmental sensor types include, but are not limited to: vector field flow (velocity and/or pressure), temperature, radiation levels, pollution levels, sound and/or light intensity, magnetic flux, gas concentration.

Figure 5A:
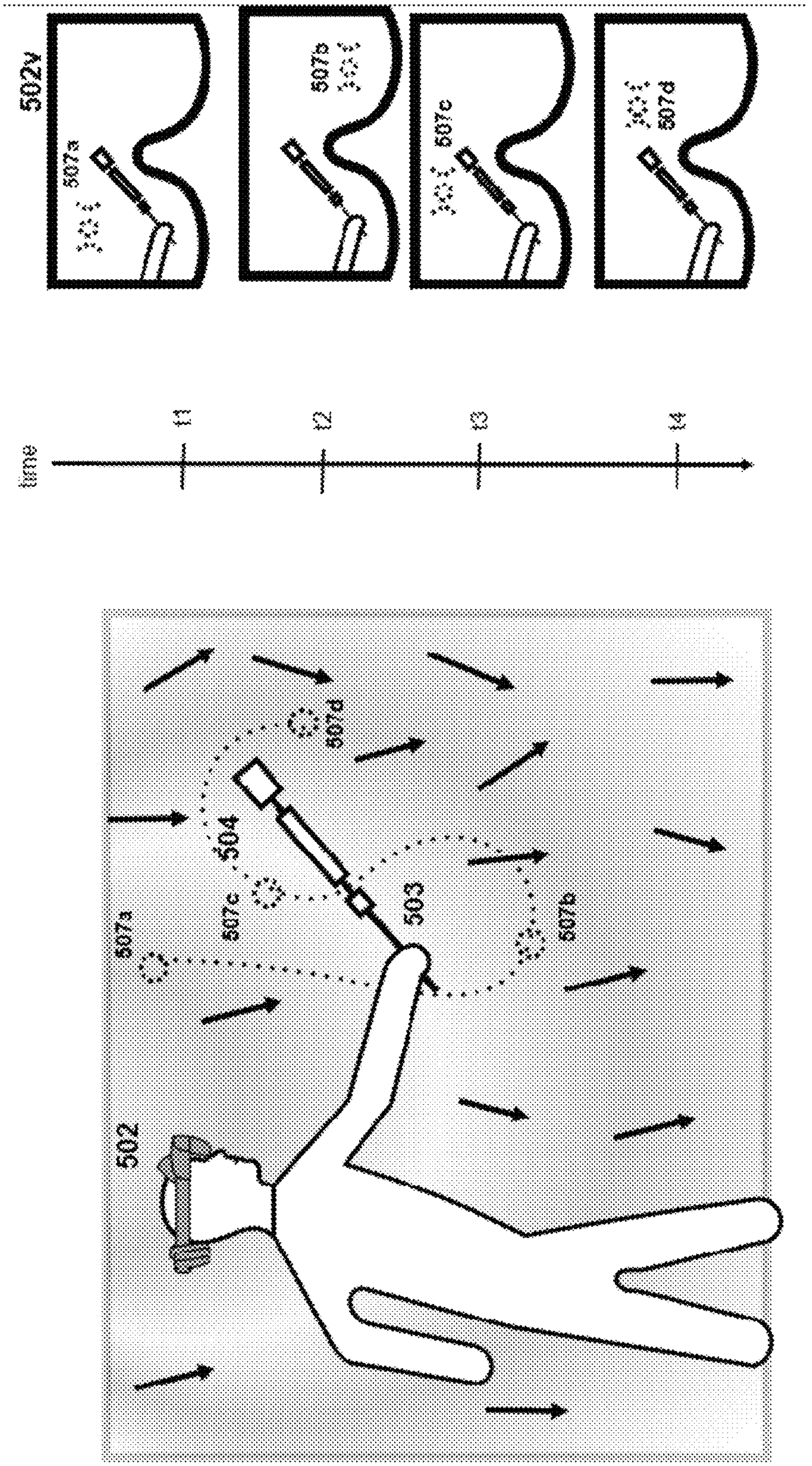
FIGS. 5A and 5B show examples of the system in use.

FIG. 5A shows an example of a measurement sequence. As the time of the measurement progresses, different suggested locations of the sensor-system are visualized from 507*a*, 507*b*, 507*c*, and finally, 507*d*. The illustration shows the physical world operator and the location of the virtual object on the left. On the right, the field of view 502*v* of the human operator in augmented reality/mixed reality blending the physical world with the virtual object as viewed from the display generation system 502.

The system is aware of the distance of the sensor-system 503 to the suggested location 507 and can adjust its behavior accordingly. As an example, the virtual object 507 of the suggested location only moves once the sensor system 503 has been placed close enough to its location (and orientation). In another example, the virtual object 507*a-d* is moved once the background process of the data model provides an update, regardless of the position of the sensor-system 503.

Figure 5B:
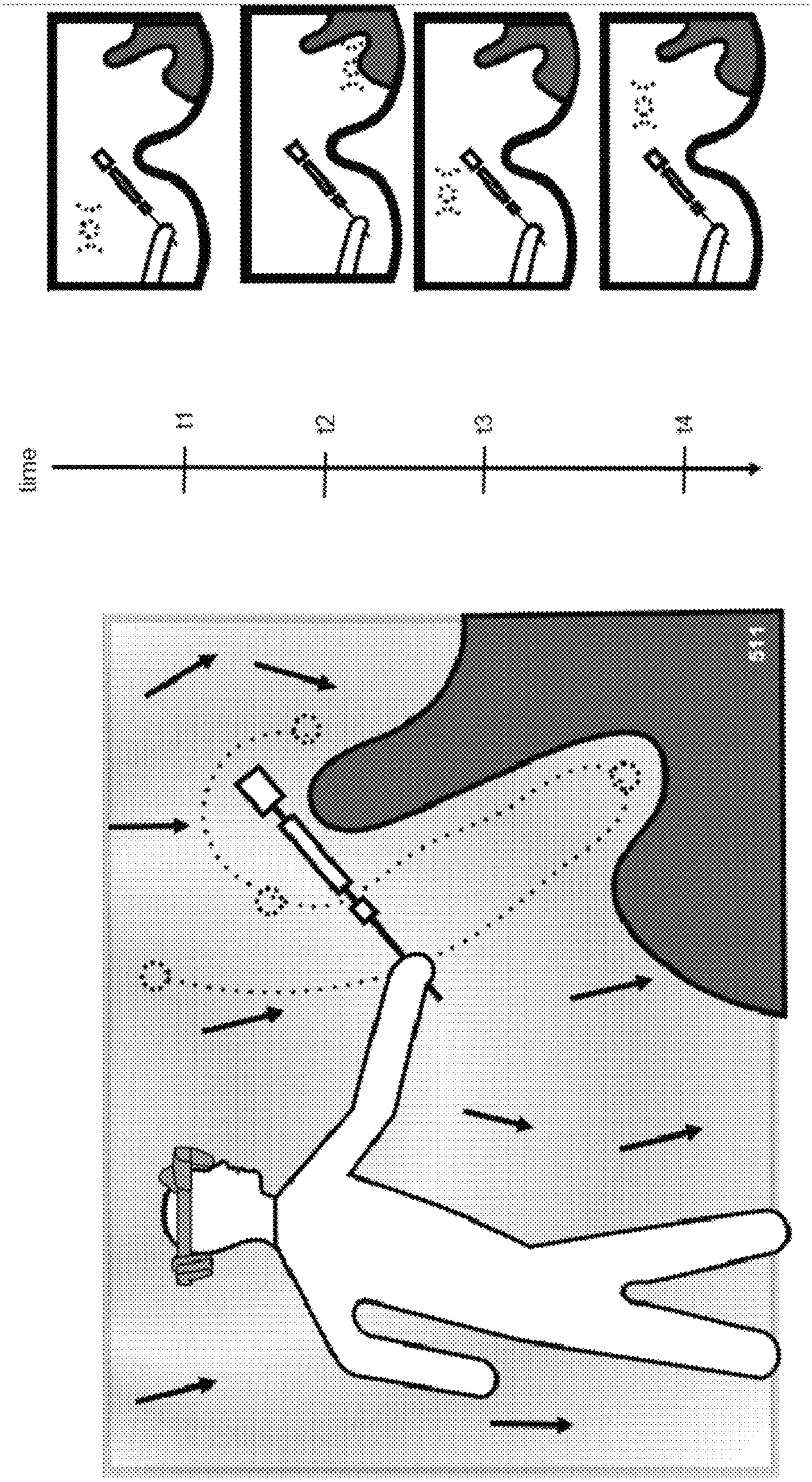

FIG. 5B shows illustrates the sample sequence of FIG. 5A with the addition of a physical object within the region of interest of the sampling process. The data model is aware of the object/shape/surface/subsurface/texture 511 in the physical world due to either scene awareness of the device or registration and tracking with or a-priori knowledge of the scene due to user input. After the sampling process, the measurement data might be stored together with the surroundings' object/surface/texture/shape (e.g., spatial mapping mesh, Neural Radiance Field, Gaussian Splatting), providing valuable context.

The data model can now suggest sampling locations (virtual object locations) in consideration of the object/surface/texture/shape 551 so as to avoid sensor collision with the object/surface/shape 551.

Figure 6A:
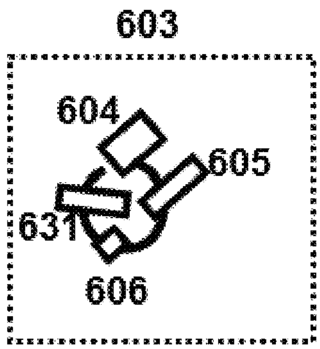
FIGS. 6A and 6B show examples of sensor types.

FIG. 6A shows an example simplified diagram of a wearable sensor device 603. The device can include an environmental sensor 604, a spatial referencing system 605, a communications module 606, and haptic feedback module 631. Examples of wearable sensor devices include wrist worn devices, rings, gloves, armbands, etc.

Figure 6B:
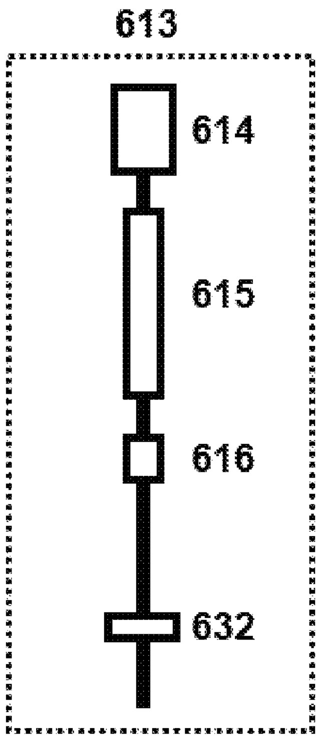

FIG. 6B shows an example simplified diagram of a hand-held sensor device 613. The device can include an environmental sensor 614, a spatial referencing system 615, a communications module 616, and haptic feedback module 632. Examples of hand-held devices include wands, rings, tablets, spheres, etc.

Figure 7:
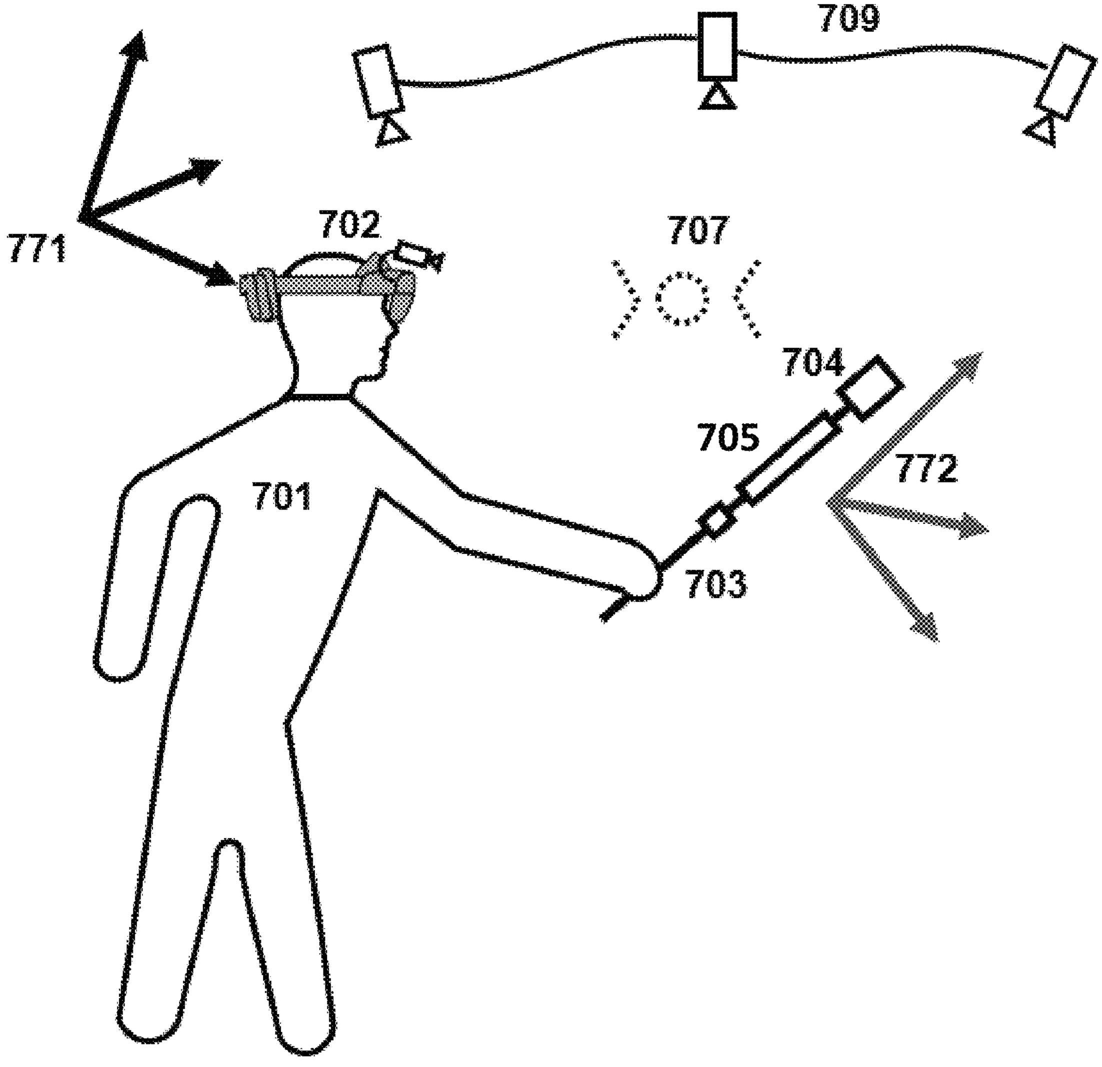
FIG. 7 shows an example of the coordinate systems of the AR device and the sensor device.

FIG. 7 shows, in some embodiments, different coordinate systems of the presented measurement system and method must be combined for determining the virtual location of the targeting object 707. For example, the coordinate system 771 is provided by the device 702 and its pose estimation capabilities, while the coordinate system 772 of the sensor-system 703 is provided either by the external spatial referencing 709 or the internal active spatial referencing 705. The measurement system may include a way of initial, or periodical, hand-eye-calibration of the display generation device 702 and the sensor-system 703 to generate a relation between the two coordinate systems 771 and 772. This calibration process can include, for example computer vision methods of the display device 702 recognizing a visual target (e.g., QR, active LED patterns, etc.) or object patterns and shapes on the sensor device 703. Other feasible methods for example are proximity sensors or movement patterns of 703 recognized by the presented system or subcomponents of it (e.g., the display device 702).

In some embodiments, only the coordinate system 771 provided by the device 702 is utilized.

In some embodiments, the system is applied in a closed environment, such as indoors or in a vehicle such as a car, plane, or spacecraft.

In some embodiments, the system is applied outdoors, or in a larger scale environment.

Depending on the setting, the spatial localization of the display device 702 might be changed (e.g., from inside-out tracking to global positioning system (GPS) or other local ranging techniques).

Figure 8:
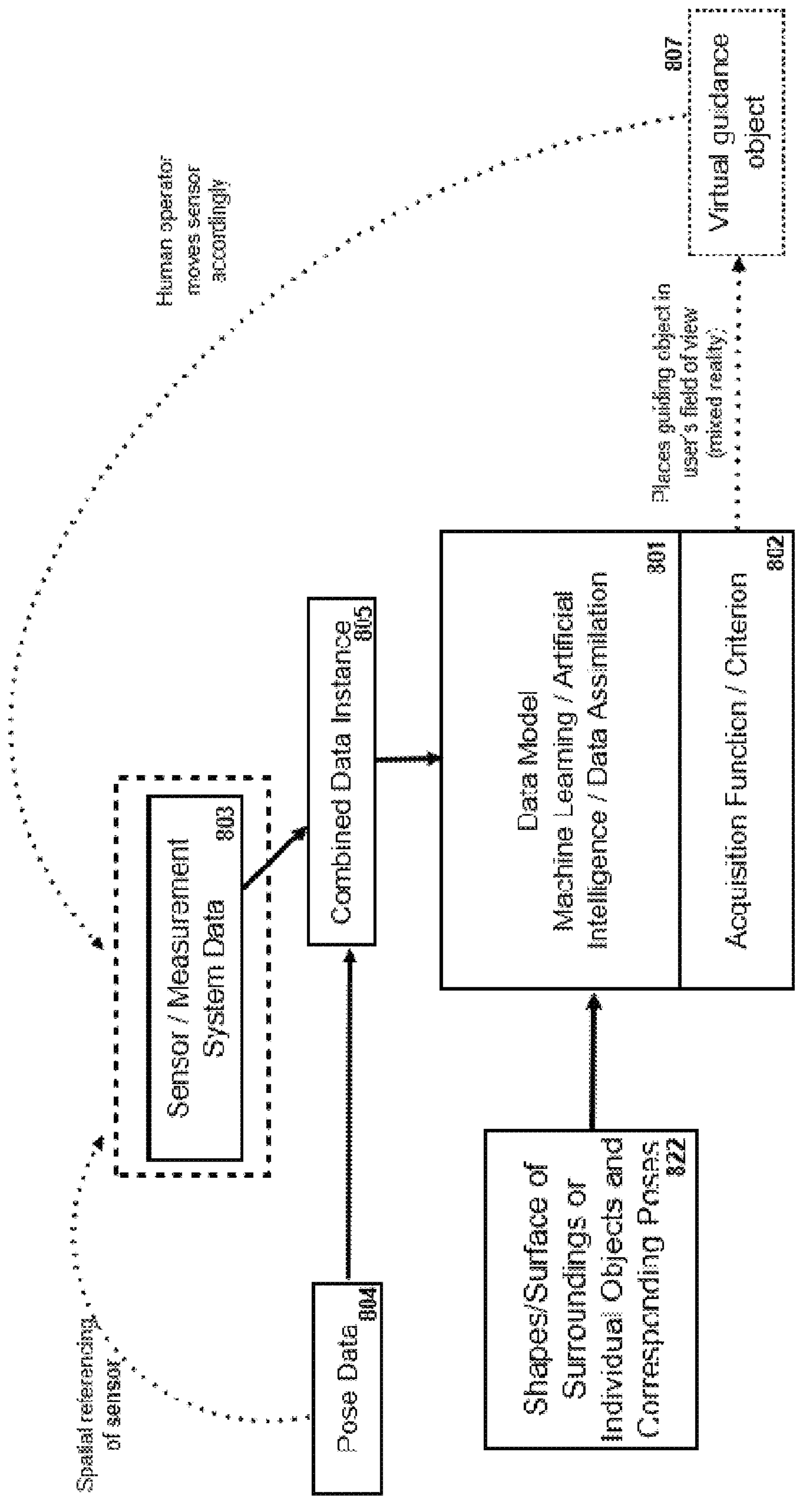
FIG. 8 shows an example block model with data streams of the systems and methods herein.

FIG. 8 shows an example block model with data streams. The sensor device gathers data 803, which is combined 805 with pose data 804 from spatial referencing of the sensor device, providing location data for the environmental readings. This is fed into a data model 801 (e.g. machine learning, neural network, artificial intelligence, data assimilation system) that feeds into an acquisition function algorithm 802 to determine the optimal location in the AR field to place a virtual object (target) 807 to guide the user to move the sensor device to next. Optionally, in some embodiments, the shapes/surfaces of surrounding objects have their location (pose) data are included in the data model 801 to prevent the system from instructing the user to move the sensor device in a way that would cause a collision.

Figure 9:
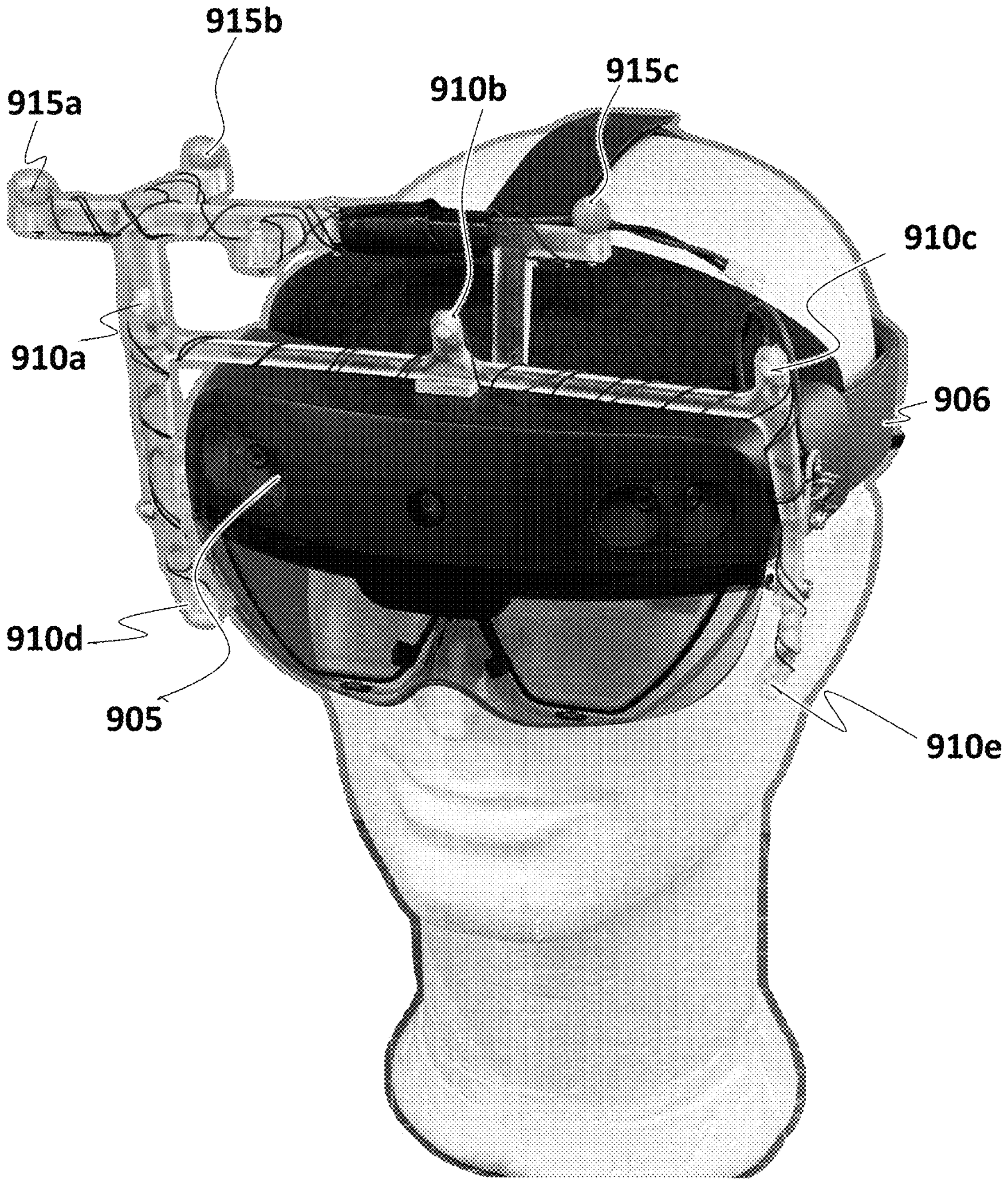
FIG. 9 shows an example headset AR device with tracking indicators.

FIG. 9 shows an example of a display device. The device in this embodiment includes a head-mounted display 905 for viewing the AR image with straps 906 to hold the device to the user's head. For spatial location, the device includes markers such as infrared LED markers 910*a*, 910*b*, 910*c*, 910*d*, 910*e* and/or reflective spheres 915*a*, 915*b*, 915*c*.

Figure 10:
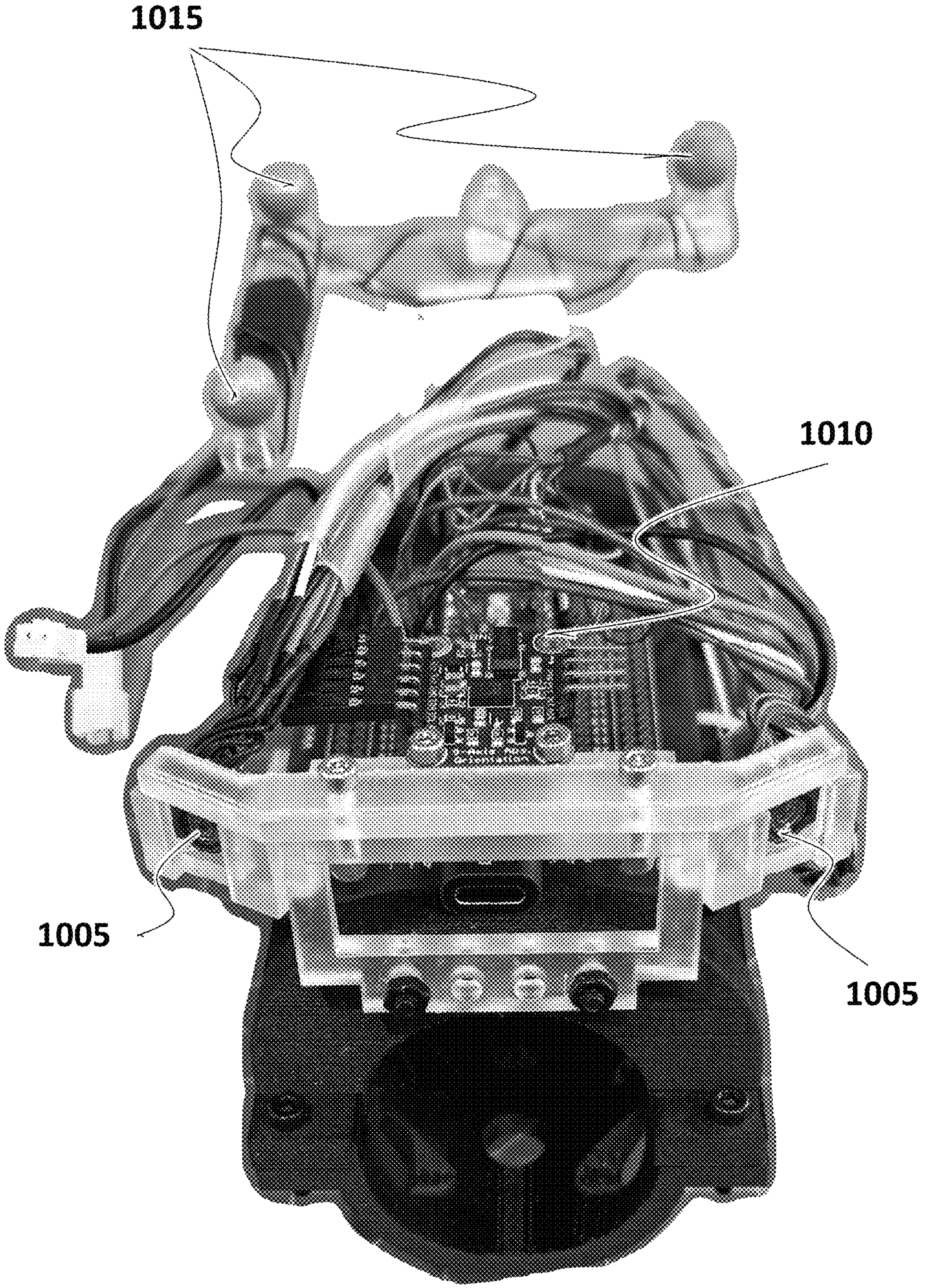
FIG. 10 shows an example wearable sensor with tracking indicators and pose estimation cameras.

FIG. 10 shows an example of a wearable sensor device. The device in this embodiment includes cameras 1005 for pose measurement with the display device, a processor 1010 for sensor data processing and/or pose calculation, and reflective elements 1015 for sensor pose/location determination by external devices.

Sensor Device Motion Capture

The rich sensor suite on modern Augmented Reality headsets offers a way to get a local pose estimation of the user's head (HMD) with respect to the shape and texture of the surrounding space based on Visual-Inertial Odometry (VIO) and Simultaneous Localization and Mapping (SLAM) algorithms. For general AR applications, the accuracy of these algorithms ensures the holographs' consistency and persistence in space between sessions.

Sensor Pose Estimation

In some embodiments, to estimate the pose of the sensor device with respect to the display device, a set of sensors similar to the approach in consumer devices for user interaction is utilized. A precise pattern of infrared LEDs is rigidly attached to the operator's display device. These LEDs are then tracked by cameras on the sensor device. Data from the cameras build the inside-out tracking of the system, looking for the pattern on the head of the operator for pose estimation.

In some embodiments, An Inertial Measurement Unit (IMU) is placed on the sensor device, allowing it to run its own VIO algorithm. This not only increases the accuracy of the sensor pose estimation but also provides more usability for the system.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A system for taking sensor readings of a region, comprising:

a sensor device configured to take the sensor readings and to provide pose information of the sensor device wherein the sensor readings characterize a three-dimensional vector field;

computer software on a non-transient medium configured to, when run on a computer, determine a location in the three-dimensional vector field to take a next sensor reading based on previous sensor readings and the pose information and using an uncertainty quantification algorithm determining the location to take the next sensor reading with the location optimizing a reconstruction of an environmental field; and a display device configured to display a virtual object at the location overlayed on a view of the region and to display virtual vector indicators representing flow direction and strength of the three-dimensional vector field within the view of the region.

2. The system of claim 1, wherein the sensor device is a wearable device.

3. The system of claim 1, wherein the display device is a head-mounted device.

4. The system of claim 1, wherein the sensor device is configured to provide pose information by pose cameras mounted on the sensor device and markers on the display device.

5. The system of claim 1, wherein the sensor device comprises a flow field sensor to take the sensor readings.

6. The system of claim 1, further comprising a wireless network system and the sensor device and the display device are configured to communicate on the wireless network system.

7. The system of claim 1, wherein the virtual object comprises a virtual indicator object that is centered at the location and side indicators configured to indicate a distance to the location from the display device.

8. The system of claim 1, wherein the computer software comprises a machine learning model.

9. A method for taking sensor readings of a region, comprising:

taking readings from the region using a sensor device wherein the readings characterize a three-dimensional vector field;

computing pose information of the sensor device producing pose data;

computing a location in the region for a next sensor reading based on previous sensor readings and the pose data and using an uncertainty quantification algorithm determining the location to take the next sensor reading with the location optimizing a reconstruction of an environmental field; and displaying on a display device a virtual indicator overlaid on a view of the region, such that the virtual indicator is at the location and virtual vector indicators representing flow direction and strength of the three-dimensional vector field within the view of the region.

10. The method of claim 9, wherein the sensor device is a wearable device.

11. The method of claim 9, wherein the display device is a head-mounted device.

12. The method of claim 9, wherein computing pose information of the sensor comprises taking data from pose cameras mounted on the sensor device and determining locations of markers on the display device.

13. The method of claim 9, wherein the taking readings comprises taking flow field sensor readings.

14. The method of claim 9, further comprising the sensor device and the display device communicating on a wireless network system.

15. The method of claim 9, wherein the virtual object comprises a virtual indicator object that is centered at the location and side indicators configured to indicate a distance to the location from the display device.

16. The method of claim 9, wherein the computing a location comprises using a machine learning model.

17. The system of claim 7, wherein the side indicators are configured to change size or distance from the central indicator to indicate the distance of the sensor device from the location.

* * * * *